United States Patent [19]

Uchida et al.

[11] Patent Number: 5,441,781
[45] Date of Patent: Aug. 15, 1995

[54] MULTI-LAYER PLASTIC FUEL TANK

[75] Inventors: Masaaki Uchida, Kanagawa; Nobuyuki Shimizu, Okayama, both of Japan

[73] Assignee: Mitsubishi Kasei Corporation, Tokyo, Japan

[21] Appl. No.: 113,752

[22] Filed: Aug. 31, 1993

[30] Foreign Application Priority Data

Aug. 31, 1992 [JP] Japan .................. 4-255914
Jun. 30, 1993 [JP] Japan .................. 5-162704

[51] Int. Cl.$^6$ ................ B32B 27/34; B65D 65/40
[52] U.S. Cl. ........................ 428/35.7; 428/476.1; 428/476.3; 220/262; 220/415; 220/416; 220/457; 206/524.1; 280/830; 261/119.1
[58] Field of Search .............. 428/35.7, 34.1, 476.1, 428/476.3; 220/562, 415, 456, 457; 206/524.1–524.6; 280/830; 261/119.1

[56] References Cited

FOREIGN PATENT DOCUMENTS 114049 12/1981 Japan.
61-042625 9/1986 Japan.

Primary Examiner—Charles R. Nold
Attorney, Agent, or Firm—Sughrue, Mion, Zinn, Macpeak & Seas

[57] ABSTRACT

A multi-layer plastic fuel tank comprising (A) a gas barrier layer having on at least one side thereof (B) an adhesive layer and further thereon (C) a high-density polyethylene layer, the gas barrier layer (A) comprising a resin having gas barrier properties, the adhesive layer (B) comprising a resin having adhesiveness to both of the gas barrier layer (A) and the high-density polyethylene layer (C), the high-density polyethylene layer (C) comprising high-density polyethylene having an intrinsic viscosity of from 2 to 6 dl/g, a density of from 0.940 to 0.970 g/cm$^2$, and a zero shear viscosity of from $2.0 \times 10^7$ to $1.0 \times 10^8$ poise at 190° C.

4 Claims, No Drawings

MULTI-LAYER PLASTIC FUEL TANK

FIELD OF THE INVENTION

The present invention relates to a multi-layer plastic fuel tank and more particularly a multi-layer plastic fuel tank which exhibits satisfactory gasoline barrier properties and which can be recycled.

BACKGROUND OF THE INVENTION

In the field of automobile industry, application of plastics (synthetic resins) to various automotive parts has been eagerly studied with the recent tendencies toward weight reduction and energy saving. Polyolefin resins have generally been used as plastic materials for their cheapness, high strength, weather resistance and chemical resistance.

High-molecular weight and high-density polyethylene has been proposed as a plastic material for a fuel tank, but it was reported that its gas barrier properties are not always sufficient so that gasoline evaporates to pollute the environment.

A multi-layer container with improved gas barrier properties has been proposed in JP-B-61-42625, which is composed of a modified nylon resin layer having laminated on one side thereof a polyolefin resin layer via an adhesive layer. (The term "JP-B" as used herein means an "examined Japanese patent publication".) The modified nylon resin layer comprises nylon and a molten mixture of a modified copolymer having a maleic anhydride content of from 0.05 to 1% by weight prepared by grafting maleic anhydride to an ethylene-$\alpha$-olefin copolymer having a degree of crystallinity of from 1 to 35% and a melt index of from 0.01 to 50 g/10 min. The adhesive layer comprises a modified copolymer having a maleic anhydride content of from 0.01 to 1% by weight prepared by grafting maleic anhydride to an ethylene-$\alpha$-olefin copolymer having a degree of crystallinity of from 2 to 30% and a melt index of from 0.01 to 50 g/10 min.

The polyolefin resin layer used in the above-mentioned multi-layer container specifically includes "Novatec BR300", a registered trade name of Mitsubishi Chemical Corp., which is high-density polyethylene having a zero shear viscosity of $1.25 \times 10^7$ poise at 190° C.

However, the multi-layer container using high-density polyethylene having a zero shear viscosity of $1.25 \times 10^7$ poise at 190° C. as a polyolefin resin layer has a disadvantage of poor Izod impact strength particularly at low temperatures. Moreover, thin-walled parts are apt to be occur in the upper portion of the multi-layer container due to its poor resistance to drawdown, and the polyolefin resin layer is apt to become non-uniform due to poor uniform melt ductility.

Recycling of molding flash or salvaged material has been considered for cost reduction of plastic fuel tanks. However, reuse of the flash or salvaged material of conventional multi-layer plastic fuel tanks involves a problem that the resulting fuel tanks have reduced impact resistance.

In order to improve impact resistance, it has been suggested to knead high-density polyethylene and a part or the whole of salvaged multi-layer plastic fuel tanks (20 to 200 parts by weight per 100 parts by weight of the high-density polyethylene) in an extruder having an L/D ratio of 20 or more and a specially shaped screw at an extruding temperature of 200° to 250° C., as described in JP-A-4-47918. (The term "JP-A" as used herein means an "unexamined published Japanese patent application").

The above-described process, however, requires to control the kneading temperature and to employ a specially shaped screw in a kneading machine. Further, it is difficult to produce a fuel tank retaining superiority in all aspects of barrier properties, impact resistance, weather resistance, and chemical resistance. Furthermore, it is not expected to inhibit reduction in impact resistance due to reuse of molding flash or salvaged material.

The present invention has been accomplished in the light of the above-described circumstances.

SUMMARY OF THE INVENTION

An object of the present invention is to provide a multi-layer plastic fuel tank which exhibits satisfactory gasoline barrier properties and which can be recycled without relying on a special kneading or molding technique to produce fuel tanks while inhibiting a reduction in impact resistance.

Other objects and effects of the present invention will be apparent from the following description.

The present invention relates to a multi-layer plastic fuel tank comprising (A) a gas barrier layer having on at least one side thereof (B) an adhesive layer and further thereon (C) a high-density polyethylene layer, the gas barrier layer (A) comprising a resin having gas barrier properties, the adhesive layer (B) comprising a resin having adhesiveness to both of the gas barrier layer (A) and the high-density polyethylene layer (C), the high-density polyethylene layer (C) comprising high-density polyethylene having an intrinsic viscosity of from 2 to 6 dl/g, a density of from 0.940 to 0.970 g/cm$^3$, and a zero shear viscosity of from $2.0 \times 10^7$ to $1.0 \times 10^8$ poise at 190° C.

DETAILED DESCRIPTION OF THE INVENTION

The multi-layer plastic fuel tank according to the present invention (hereinafter sometimes referred to as multi-layer fuel tank) comprises gas barrier layer (A) having laminated on at least one side thereof high-density polyethylene layer (C) via adhesive layer (B).

The gas barrier layer (A) will be described in detail below.

Resins with gas barrier properties are used in gas barrier layer (A). Examples thereof include a modified polyamide composition comprising a mixture of (1) an $\alpha,\beta$-unsaturated carboxylic acid-modified ethylene-$\alpha$-olefin copolymer prepared by grafting an $\alpha,\beta$-unsaturated carboxylic acid or a derivative thereof to an ethylene-$\alpha$-olefin copolymer at a grafting ratio of from 0.05 to 1% by weight, preferably from 0.2 to 0.6% by weight, based on the ethylene-$\alpha$-olefin copolymer and (2) a polyamide. The ethylene-$\alpha$-olefin copolymer, preferably has a degree of crystallinity of from 1 to 35%, more preferably from 1 to 30%, and a melt index of from 0.01 to 50 g/10 min, more preferably from 0.1 to 20 g/10 min. Examples of the the $\alpha,\beta$-unsaturated carboxylic acid or a derivative thereof include monocarboxylic acids, such as acrylic acid and methacrylic acid, their derivatives, dicarboxylic acids, such as maleic acid, fumaric acid and citraconic acid, and their derivatives. Preferred examples of the $\alpha,\beta$-unsaturated carboxylic acid or a derivative thereof include maleic anhydride.

The modified polyamide composition will be further described below in greater detail.

Examples of the α-olefins in the ethylene-α-olefin copolymer (1) include propylene, butene-1, hexene-1, etc. The α-olefin is generally copolymerized with ethylene at a ratio of not more than 30% by weight, and preferably from 5 to 20% by weight, based on the total amount of the copolymer.

The polyamide (2) generally has a relative viscosity of from about 1 to 6. Examples of the polyamide includes polyamide obtained by polycondensation of a diamine and a dicarboxylic acid, polyamide obtained by polycondensation of an aminocarboxylic acid, polyamide obtained by polycondensation of a lactam, and copolyamide thereof.

Examples of the diamine includes aliphatic, alicyclic or aromatic diamines, such as hexamethylenediamine, decamethylenediamine, dodecamethylenediamine, trimethylhexamethylenediamine, 1,3-bis(aminomethyl)-cyclohexane, 1,4-bis(aminomethyl)cyclohexane, bis(p-aminocyclohexylmethane), m-xylylenediamine, and p-xylylenediamine. Examples of the dicarboxylic acid includes aliphatic, alicyclic or aromatic dicarboxylic acids, such as adipic acid, suberic acid, sebacic acid, cyclohexanedicarboxylic acid, terephthalic acid, and isophthalic acid. Examples of the aminocarboxylic acid includes ε-aminocaproic acid and 11-aminoundecanoic acid. Examples of the lactam includes ε-caprolactam and ε-laurolactam.

Specific examples of the polyamide include nylon 6, nylon 66, nylon 610, nylon 9, nylon 11, nylon 12, nylon 6/66, nylon 66/610, and nylon 6/11.

From the standpoint of moldability, a polyamide having a melting point of from 170° to 280° C., and particularly from 200° to 240° C., is preferred. Nylon 6 is particularly preferred.

The α,β-unsaturated carboxylic acid-modified ethylene-α-olefin copolymer is generally mixed with the polyamide in an amount of from 10 to 50 parts by weight, and preferably from 10 to 30 parts by weight, per 100 parts by weight of the polyamide.

While the method of mixing is not particularly restricted, it is preferred to knead them in an extruder, etc. at a temperature of from 200° to 280° C.

The adhesive layer (B) will be described in detail below.

The adhesive layer (B) comprises a resin having adhesiveness to both of the gas barrier layer (A) and the high-density polyethylene layer (C).

Examples of the resin used in the adhesive layer (B) include a modified polyethylene prepared by grafting an unsaturated carboxylic acid or a derivative thereof to high-density polyethylene, preferably at a grafting ratio of from 0.01 to 1% by weight based on the high-density polyethylene.

The modified polyethylene will be further described in detail below.

High-density polyethylene having a density of from 0.940 to 0.970 g/cm$^3$ is preferably used in the above-mentioned modified polyethylene. Examples of the high-density polyethylene includes an ethylene homopolymer and a copolymer of ethylene and not more than 3% by weight, preferably from 0.05 to 0.5% by weight, of an α-olefin. Examples of the α-olefin includes propylene, butene-1, hexene-1, etc. Examples of the unsaturated carboxylic acid or a derivative thereof includes acrylic acid, methacrylic acid, maleic acid, fumaric acid, itaconic acid, citraconic acid, and an anhydride thereof, with maleic anhydride being particularly preferred. The amount of the unsaturated carboxylic acid or a derivative thereof to be grafted is preferably from 0.02 to 0.06% by weight.

The high-density polyethylene layer (C) will be described in detail below.

The high-density polyethylene layer (C) comprises high-density polyethylene having an intrinsic viscosity of from 2 to 6 dl/g, preferably from 2.3 to 5.5 dl/g, a density of from 0.940 to 0.970 g/cm$^3$, preferably from 0.950 to 0.965 g/cm$^3$, and a zero shear viscosity of from $2.0 \times 10^7$ to $1.0 \times 10^8$ poise, preferably from $2.5 \times 10^7$ to $9.0 \times 10^7$ poise, at 190° C.

Examples of the high-density polyethylene include those of various species prepared by known processes, such as an ethylene homopolymer and a copolymer of ethylene and not more than 3% by weight, preferably from 0.05 to 0.5% by weight, of an α-olefin. Examples of the α-olefin includes propylene, butene-1, hexene-1, etc.

If the intrinsic viscosity or zero shear viscosity of the high-density polyethylene deviates from the above-specified respective range, molding properties, such as resistance to drawdown and uniform melt ductility, and impact resistance would be reduced.

If desired, the high-density polyethylene layer may contain additives, such as pigments and thermal stabilizers, in an amount of not more than 1 part by weight per 100 parts by weight of the high-density polyethylene.

The multi-layer fuel tank according to the present invention will be described in detail below.

The multi-layer plastic fuel tank of the present invention comprises the gas barrier layer (A) having laminated on at least one side thereof high-density polyethylene layer (C) via adhesive layer (B). In particular, a 5-layered structure comprising 3 kinds of layers, in which gas barrier layer (A) has on both sides thereof high-density polyethylene layer (C) via adhesive layer (B), is preferred.

In designing the multi-layer fuel tank of the present invention, the thickness of the gas barrier layer (A) is generally from 0.01 to 0.5 mm, preferably from 0.1 to 0.3 mm; that of adhesive layer (B) is generally from 0.01 to 0.5 mm, preferably from 0.1 to 0.3 mm; and that of high-density polyethylene layer (C) is generally from 1 to 10 mm, preferably from 1.5 to 5 mm.

The multi-layer fuel tank of the present invention can be produced by a known blow molding method.

For example, resins for each layer are separately plasticized in a plurality of extruders, introduced into the same die having concentric ring flow paths, laminated in the die while levelling each thickness to prepare an apparently one-layered parison. The parison is inflated in a mold by application of inner pressure of air to be brought into intimate contact with the mold and, at the same time, cooled to produce a multi-layer fuel tank.

In the production of the multi-layer fuel tank, the molding flash resulting from the molding of the tank and/or salvaged fuel tanks may be reused as a part of the molding material. The flash or salvaged material is generally ground in a polymer grinder to particles or powder and mixed with pellets of the high-density polyethylene used for the high-density polyethylene layer (C). The mixing ratio of the flash or salvaged material is preferably not more than about 60 parts by weight, more preferably not more than 40 parts by weight, per 100 parts by weight of the high-density polyethylene. It is also preferred to dry the flash and salvaged material prior to mixing.

The multi-layer fuel tank of the present invention, even when produced by reusing the molding flash and/or salvaged material, exhibits satisfactory adhesion between the high-density polyethylene layer and the gas barrier layer and undergoes no reduction in strength of the high-density polyethylene layer.

The multi-layer fuel tank according to the present invention exhibits excellent gasoline barrier properties and is therefore suitable as a fuel tank, such as a gasoline tank. Even where molding flash resulting from the production step or salvaged tanks are mixed with the high-density polyethylene, fuel tanks with satisfactory impact resistance can be produced.

The present invention will now be illustrated in greater detail by way of Examples, but the present invention is not limited thereto within the scope of the present invention.

The raw materials used were as follows:

(1) High-density polyethylene (HDPE):
  A: Ethylene-butene-1 copolymer (butene-1 content: 0.2 wt %); intrinsic viscosity: 2.41 dl/g; density: 0.953 g/cm$^3$; zero shear viscosity: $4.70 \times 10^7$ poise
  B: Ethylene-butene-1 copolymer (butene-1 content: 0.18 wt %); intrinsic viscosity: 4.2 dl/g; density: 0.954 g/cm$^3$; zero shear viscosity: $4.48 \times 10^7$ poise
  C: Ethylene-hexene-1 copolymer (hexene-1 content: 0.18 wt %); intrinsic viscosity: 5.3 dl/g; density: 0.954 g/cm$^3$; zero shear viscosity: $9.00 \times 10^7$ poise
  D: Ethylene-hexene-1 copolymer (hexene-1 content: 0.2 wt %); intrinsic viscosity: 2.33 dl/g; density: 0.951 g/cm$^3$; zero shear viscosity: $1.47 \times 10^7$ poise
  E: Novatec BR300 (a registered trade name of Mitsubishi Chemical Corp.); intrinsic viscosity: 2.80 dl/g; density: 0.947 g/cm$^3$; zero shear viscosity: $1.25 \times 10^7$ poise (2) Modified polyethylene (APO):
  F: Modified polyethylene prepared by grafting maleic anhydride (0.4 wt %) to high-density polyethylene having a density of 0.960 g/cm$^3$; melt index (MI): 0.1 g/10 min (3) Modified polyamide composition (MPA):
  G: Modified polyamide composition prepared by mixing 80 parts by weight of nylon 6 having a relative viscosity of 4.0 and 20 parts by weight of an ethylene-butene-1 copolymer (butene-1 content: 13 mol %; degree of crystallinity: 20%; MI: 3.5 g/10 min) modified by 0.3 wt % of maleic anhydride (4) Polyamide (PA):
  H: Nylon 6 having a relative viscosity of 3.5 ("Novamid 1020" a registered trade name of Mitsubishi Chemical Corp.)

The physical properties of the raw materials were measured according to the following methods:

1) Intrinsic Viscosity ($\eta$):
  Measured at 130° C. in tetralin.
2) Density:
  Measured in accordance with JIS K6760.
3) Zero Shear Viscosity ($\eta_0$):

Stress rheometer "RSR-M" manufactured by Rheometrics Co. was used for measurement. This apparatus enables measurement of a melt shear viscosity in a low shear rate region from creep characteristics.

In general, a shear viscosity of a molten polymer reaches a stationary value at a low shear rate (not more than $10^3$ sec$^{-1}$) and becomes smaller as the shear rate increases. The term "zero shear viscosity ($\eta_0$)" is the above-mentioned stationary value.

The fixture was a cone-disc type having a diameter of 25 mm at an angle of 0.1 rad between the cone and the disc.

The test specimens were prepared by pressing pellets in a press molding machine into a sheet having a thickness of about 1 mm. The measuring temperature was 190° C.

EXAMPLES 1 TO 3 AND COMPARATIVE EXAMPLES 1 TO 3

Preparation of Multi-layer Fuel Tank:

Multi-layer fuel tanks having the layer structure (5-ply laminate of 3 kinds of layers) shown in Tables 2 and 3 below were prepared as follows.

Resins for each layer as shown in Tables 2 and 3 were separately melted in the respective extruder, introduced into the same die with concentric ring flow paths, laminated in the die (die temperature: 235° C.), and coextruded to form a molten tube (parison).

The resulting parison was clamped in a mold (mold temperature: 20° C.), and air was fed into the parison at a pressure of 6 kg/cm$^2$ to obtain a 60 l-volume multi-layer fuel tank having the layer structure and layer thickness as shown in Table 2.

The cylinder temperature in each extruder was as shown in Table 1.

TABLE 1

| | |
|---|---|
| High-density polyethylene (HDPE) | 185–215° C. |
| Modified polyethylene (APO) | 170–230° C. |
| Modified polyamide (MPA) | 240–245° C. |
| Polyamide (PA) | 240–245° C. |

TABLE 2

| Layer | Resin | Thickness (μm) |
|---|---|---|
| Outer HDPE layer | HDPE | 2,600 |
| Outer Adhesive layer | APO | 100 |
| Barrier layer | MPA or PA | 100 |
| Inner Adhesive layer | APO | 100 |
| Inner HDPE layer | HDPE | 2,600 |

TABLE 3

| | Example | | | Comparative Example | | |
|---|---|---|---|---|---|---|
| Layer | 1 | 2 | 3 | 1 | 2 | 3 |
| Inner and Outer HDPE Layer | HDPE A | HDPE B | HDPE C | HDPE D | HDPE E | HDPE A |
| Inner and Outer Adhesive Layer | APO F | APO F | APO F | APO F | APO F | APO F |
| Barrier Layer | MPA G | MPA G | MPA G | MPA G | MPA G | PA H |

Where HDPE E was used as the high-density polyethylene layer, the extruded parison underwent draw-down while being clamped in a mold, which appeared as thin-walled part in the upper portion of the resulting molded article (fuel tank). Further, the high-density polyolefin layer had poor uniformity due to insufficient melt ductility.

Strength Test of Multi-layer Fuel Tank:

Each of the multi-layer fuel tanks produced in Examples 1 to 3 and Comparative Examples 1 to 3 was filled up with water or antifreeze. The tank was dropped from the height shown in Table 4 at the temperature shown in Table 4. The strength was evaluated by any crack produced. The results are shown in Table 4.

TABLE 4

| Temperature and height | Example 1 | Example 2 | Example 3 | Comparative Example 1 | Comparative Example 2 | Comparative Example 3 |
|---|---|---|---|---|---|---|
| Room temp., 16 m | no crack | no crack | no crack | no crack | no crack | no crack |
| −40° C., 6 m | no crack | no crack | no crack | no crack | no crack | no crack |
| −40° C., 9 m | no crack | no crack | no crack | no crack | no crack | no crack |
| −40° C., 16 m | no crack | no crack | no crack | cracked | cracked | cracked |

EXAMPLES 4 AND 5 AND COMPARATIVE EXAMPLES 4 TO 6

Each of the multi-layer fuel tanks produced in Examples 1 and 3 and Comparative Examples 1 to 3 was ground in a crusher having a punching plate hole diameter of 8 mm. The grinds were kneaded in a single-screw extruder or a twin-screw extruder under the conditions shown in Table 5 to obtain chips. A 60 l-volume 5-layered fuel tank comprising 3 kinds of layers was produced in the same manner as in Example 1, except that the high-density polyethylene layer was composed of the high-density polyethylene mixed with the resulting chips in an amount of 40% by weight based on the amount of the mixture.

TABLE 5

| | |
|---|---|
| (1) | Single-screw extruder: |
| | A product of Union Plastics K.K. ("30 ∅") |
| | L/D: 20; Compression ratio: 3.2 |
| | Full-flighed screw |
| | Resin temperature: 240° C. |
| (2) | Twin-screw extruder: |
| | A product of Japan Steel Works, Ltd. ("TEX44HCT") |
| | L/D: 24.5 |
| | Kneading part: kneading disc |
| | Resin temperature: 240° C. |

Strength Test of Multi-layer Fuel Tank:

Each of the multi-layer fuel tanks produced in Examples 4 and 5 and Comparative Examples 4 to 6 was tested for its strength in the same manner as in Example 1. The results obtained are shown in Table 6.

TABLE 6

| Temperature and height | Example 4 | Example 5 | Comparative Example 4 | Comparative Example 5 | Comparative Example 6 |
|---|---|---|---|---|---|
| Room temp., 16 m | no crack | no crack | no crack | no crack | no crack |
| −40° C., 6 m | no crack | no crack | no crack | no crack | no crack |
| −40° C., 9 m | no crack | no crack | no crack | no crack | cracked |
| −40° C., 12 m | no crack | no crack | cracked | cracked | cracked |

Evaluation of Material Characteristics:

In Examples 4 and 5 and Comparative Examples 4 to 6, the chips obtained were measured for a specific energy Esp in each extruder and the particle diameter of polyamide (NY). The results obtained are shown in Tables 7 and 8. Further, the chips were pressed at 230° C. to prepare an Izod test specimen, and an Izod strength was measured at 23° C. or −40° C. according to JIS K 7110. The results obtained are shown in Tables 7 and 8 together with an Izod strength retention with respect to an Izod test specimen comprising HDPE alone.

TABLE 7

| | (Single-Screw Extruder) | | | | |
|---|---|---|---|---|---|
| | Example | | Comparative Example | | |
| | 4 | 5 | 4 | 5 | 6 |
| Specific Energy Esp | 0.2 | 0.2 | 0.2 | 0.2 | 0.2 |
| Particle Diameter of NY (μm) | 25 | 25 | 30 | 30 | 30 |
| Izod Strength (23° C.) | 23 | NB | 22 | 14 | 20 |
| Retention (%) | 100 | 100 | 100 | 100 | 87 |
| Izod Strength (−40° C.) | 19 | NB | 6 | 8 | 12 |
| Retention (%) | 100 | 100 | 100 | 100 | 63 |

Note: Specific energy EsP: kg · h/kw
Izod strength: kg · cm/cm

TABLE 8

| (Twin-Screw Extruder) | |
|---|---|
| | Example 4 |
| Specific Energy Esp | 0.25 |
| Particle Diameter of NY (μm) | 20 |
| Izod Strength (23° C.) | 23 |
| Retention (%) | 100 |
| Izod Strength (−40° C.) | 19 |
| Retention (%) | 100 |

As described above, the present invention provides a multi-layer plastic fuel tank which exhibits satisfactory gasoline barrier properties and which can be recycled without requiring a special kneading or molding technique to produce fuel tanks while inhibiting a reduction in impact resistance.

While the invention has been described in detail and with reference to specific examples thereof, it will be apparent to one skilled in the art that various changes and modifications can be made therein without departing from the spirit and scope thereof.

What is claimed is:

1. A multi-layer plastic fuel tank comprising (A) a gas barrier layer having on at least one side thereof (B) an adhesive layer and further thereon (C) a high-density polyethylene layer, said gas barrier layer (A) comprising a modified polyamide composition comprising (1) an α,β-unsaturated carboxylic acid-modified ethylene-α-olefin copolymer prepared by grafting an α,β-unsaturated carboxylic acid or a derivative thereof to an ethylene-α-olefin copolymer at a grafting ratio of from 0.05 to 1% by weight based on said ethylene-α-olefin copolymer, and (2) polyamide, the amount of said ethylene-α-olefin copolymer (1) being from 10 to 50 parts by weight per 100 parts by weight of said polyamide (2), said adhesive layer (B) comprising a modified polyethylene prepared by grafting an unsaturated carboxylic acid or a derivative thereof, said high-density polyethylene layer (C) comprising high-density polyethylene having an intrinsic viscosity of from 2 to 6 dl/g, a density of from 0.940 to 0.970 g/cm$^3$, and a zero shear viscosity of from $2.0 \times 10^7$ to $1.0 \times 10^8$ poise at 190° C.

2. A multi-layer plastic fuel tank as claimed in claim 1, wherein said ethylene-α-olefin copolymer is an ethylene-α-olefin copolymer having a degree of crystallinity of from 1 to 35% and a melt index of from 0.01 to 50 g/10 min.

3. A multi-layer plastic fuel tank as claimed in claim 1, wherein said α,β-unsaturated carboxylic acid or a derivative thereof is maleic anhydride.

4. A multi-layer plastic fuel tank as claimed in claim 1, wherein said modified polyethylene is prepared by grafting an unsaturated carboxylic acid or a derivative thereof to high-density polyethylene at a grafting ratio of from 0.01 to 1% by weight based on the high-density polyethylene.

* * * * *